(12) United States Patent
Sorg

(10) Patent No.: US 10,711,944 B2
(45) Date of Patent: Jul. 14, 2020

(54) GREASE GUN CARTRIDGE CONSTRUCTION

(71) Applicant: GREE-SEE Technology, LLC, Johnson City, TN (US)

(72) Inventor: Daniel Mark Sorg, Elizabethton, TN (US)

(*) Notice: Subject to any disclaimer, the term of this patent is extended or adjusted under 35 U.S.C. 154(b) by 0 days.

(21) Appl. No.: 15/922,270

(22) Filed: Mar. 15, 2018

(65) Prior Publication Data
US 2018/0202604 A1 Jul. 19, 2018

Related U.S. Application Data

(63) Continuation-in-part of application No. 15/877,508, filed on Jan. 23, 2018, now abandoned, which is a continuation of application No. 14/997,073, filed on Jan. 15, 2016, now Pat. No. 9,874,310.

(51) Int. Cl.
*B05C 17/005* (2006.01)
*F16N 37/02* (2006.01)
*F16N 3/12* (2006.01)

(52) U.S. Cl.
CPC ........ *F16N 37/02* (2013.01); *B05C 17/00576* (2013.01); *B05C 17/00596* (2013.01); *F16N 3/12* (2013.01)

(58) Field of Classification Search
CPC ..... F16N 37/02; F16N 3/12; B05C 17/00576; B05C 17/00596
USPC ........................................................ 222/326
See application file for complete search history.

(56) References Cited

U.S. PATENT DOCUMENTS

| | | | |
|---|---|---|---|
| 1,368,840 A | 8/1919 | Rischard | |
| 1,349,994 A | 8/1920 | Wood | |
| 1,659,950 A * | 2/1928 | Goodman | F16N 3/12 222/262 |
| 1,718,985 A | 7/1929 | Scoville | |
| 1,746,604 A * | 2/1930 | Piquerez | F16N 3/12 222/278 |
| 1,833,528 A | 11/1931 | Linton | |
| 1,905,913 A | 4/1933 | Kopp | |
| 1,926,398 A | 9/1933 | Nielsen | |
| 1,945,813 A | 6/1934 | Johnson | |
| 1,961,553 A * | 6/1934 | Dodge | F16N 3/12 222/256 |

(Continued)

OTHER PUBLICATIONS

International Search Report and Written Opinion of the International Search Authority dated Apr. 3, 2017, International Application No. PCT/US2017/013659.

(Continued)

*Primary Examiner* — Benjamin R Shaw
(74) *Attorney, Agent, or Firm* — Matthew M. Googe; Robinson IP Law, PLLC

(57) ABSTRACT

A grease gun cylinder walled cartridge adapted for direct attachment to any of a variety of grease gun head constructions and grease pumping systems, wherein the cartridge wall can be of any color or completely clear and see through, wherein the grease column within the cartridge is pressured toward and through an inlet port in the gun head, which port opens on the suction stroke of a piston mounted in said cylinder into a loading portion of a cylinder of the grease pumping system, and wherein the grease column pressuring means is ambient air pressure.

6 Claims, 14 Drawing Sheets

(56) References Cited

U.S. PATENT DOCUMENTS

| | | | | |
|---|---|---|---|---|
| 1,975,313 | A | * | 10/1934 | Creveling ................. F16N 3/12 222/256 |
| 2,010,174 | A | * | 8/1935 | Barks ....................... F16N 3/12 285/325 |
| 2,205,604 | A | | 6/1940 | Sherbondy |
| 2,275,108 | A | | 3/1942 | Levanas |
| 2,759,640 | A | | 8/1956 | Deupree |
| 2,915,226 | A | | 12/1959 | Sundholm |
| 2,978,151 | A | | 4/1961 | Sundholm |
| 3,246,802 | A | | 4/1966 | Fuhrmann |
| 3,338,478 | A | | 8/1967 | Hedblad |
| 3,344,084 | A | | 9/1967 | Leland |
| 3,393,840 | A | | 7/1968 | Sundholm |
| 3,653,555 | A | | 4/1972 | Dorn |
| 4,601,412 | A | | 7/1986 | Martin |
| 4,664,298 | A | | 5/1987 | Shew |
| 4,775,302 | A | | 10/1988 | Neward |
| 4,834,268 | A | * | 5/1989 | Keller ................ B05C 17/00576 222/327 |
| 5,044,525 | A | * | 9/1991 | McKinney ......... B65D 83/0016 222/326 |
| 5,139,178 | A | | 8/1992 | Arch |
| 5,650,180 | A | * | 7/1997 | Kumada ........... B05C 17/00576 206/384 |
| 6,068,164 | A | * | 5/2000 | Totaro ....................... F16N 3/12 222/389 |
| 6,135,327 | A | | 10/2000 | Post et al. |
| 6,395,006 | B1 | * | 5/2002 | Burchett ............ A61B 17/8816 606/92 |
| 6,834,781 | B1 | | 12/2004 | Mueller |
| 7,377,406 | B2 | | 5/2008 | Linkletter |
| 7,458,487 | B1 | * | 12/2008 | Ikushima .......... B05C 17/00576 222/262 |
| 9,057,482 | B2 | | 6/2015 | Hung |
| 9,062,825 | B2 | | 6/2015 | Ryan |
| 2003/0183634 | A1 | | 10/2003 | Cousseau |
| 2005/0103808 | A1 | | 5/2005 | Zschiedrich |
| 2008/0029549 | A1 | * | 2/2008 | Hulden .................... F16N 3/12 222/256 |
| 2010/0116850 | A1 | | 5/2010 | Weems |
| 2010/0237094 | A1 | * | 9/2010 | Benjamin, II .... B05C 17/00576 222/1 |
| 2010/0294808 | A1 | | 11/2010 | He |
| 2011/0309111 | A1 | * | 12/2011 | Helmenstein ..... B05C 17/00576 222/386 |
| 2014/0061242 | A1 | | 3/2014 | Kuo |
| 2015/0233524 | A1 | | 8/2015 | Kuo |

OTHER PUBLICATIONS

International Preliminary Report on Patentability dated Jan. 19, 2018, International Application No. PCT/US2017/013659.

* cited by examiner

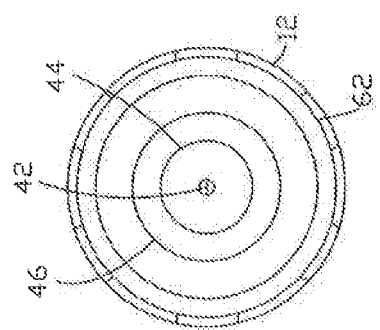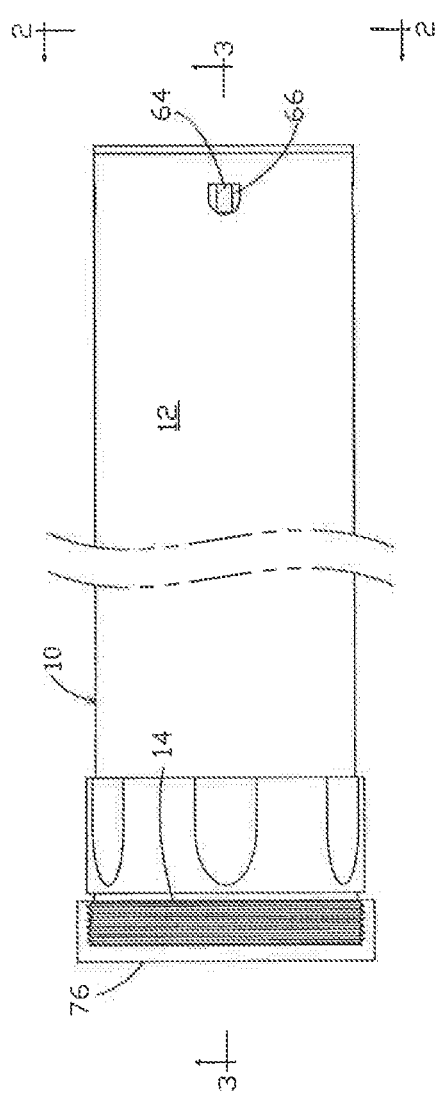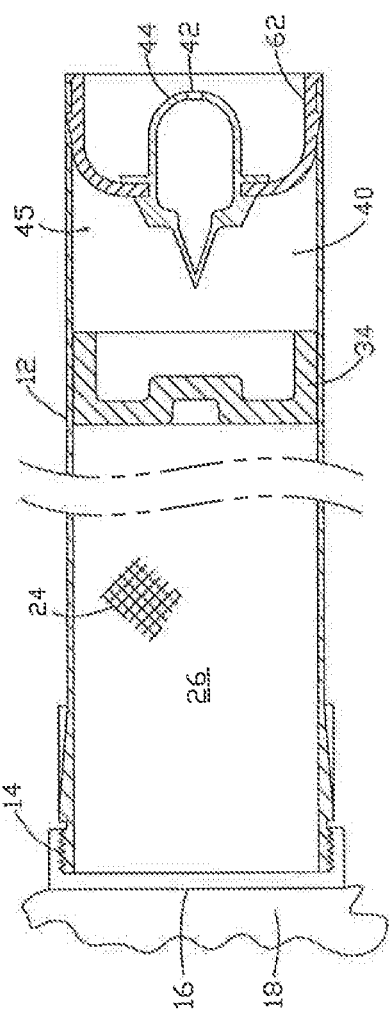

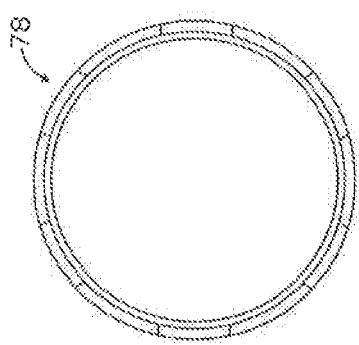
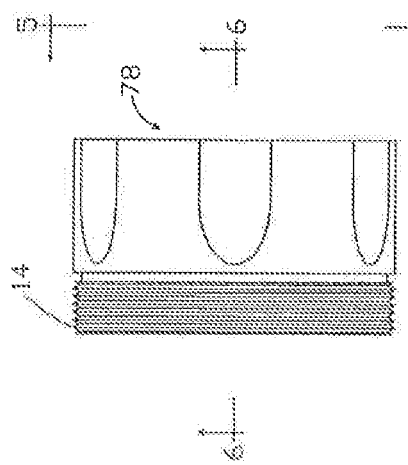
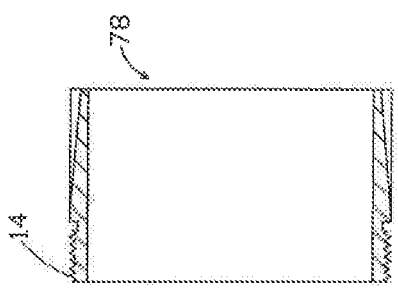

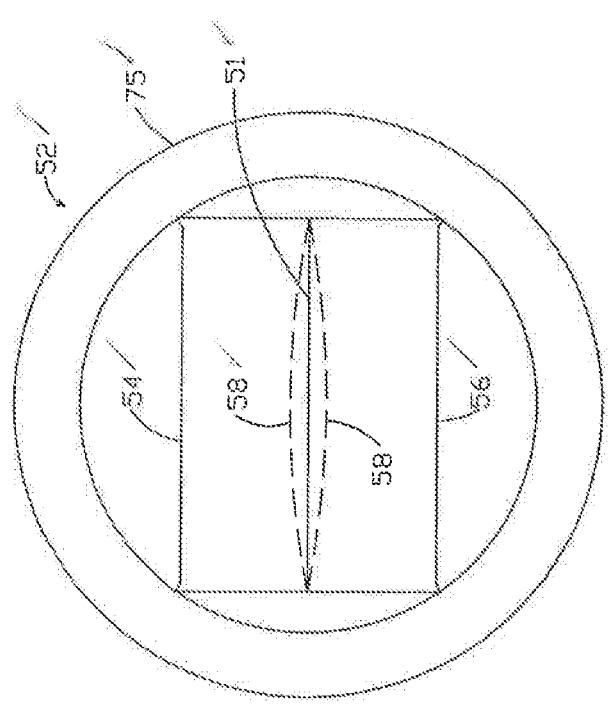

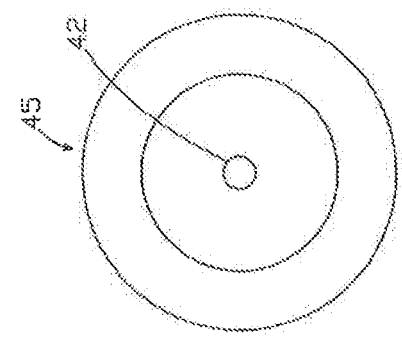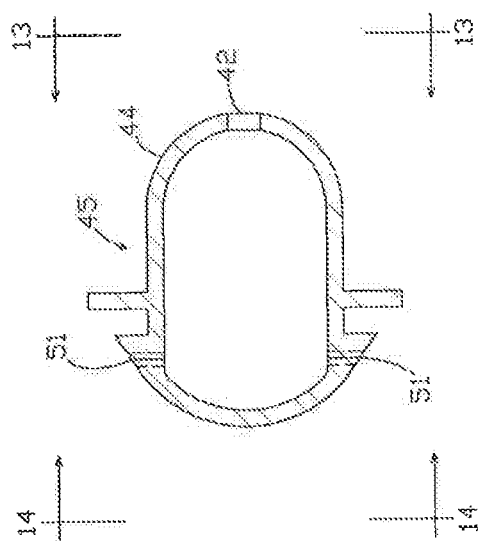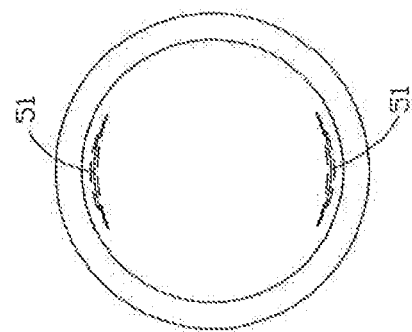

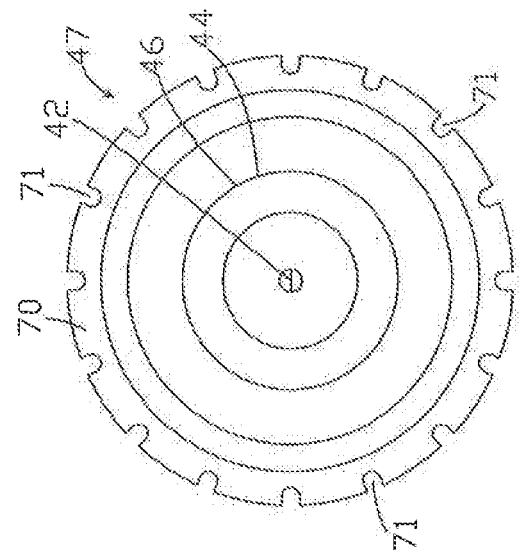
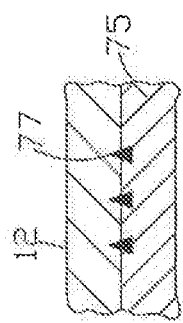
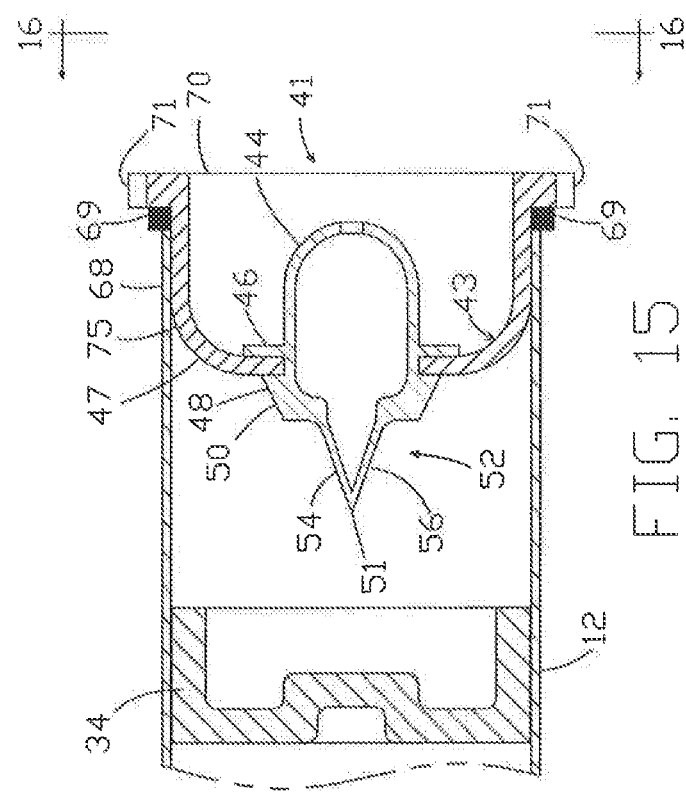

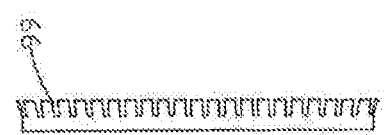
FIG. 22
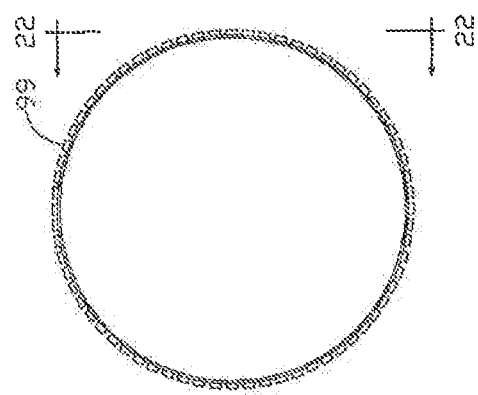
FIG. 21
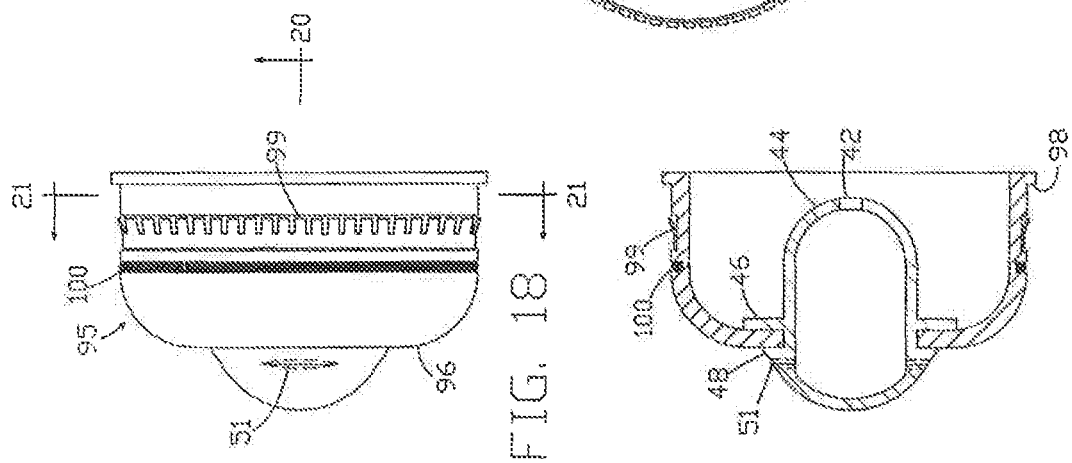
FIG. 18
FIG. 20
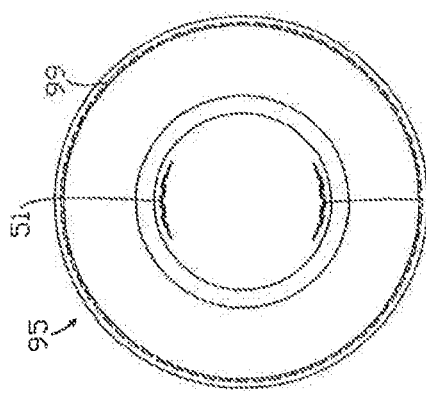
FIG. 19

GREASE GUN CARTRIDGE CONSTRUCTION

CROSS-REFERENCE TO RELATED APPLICATION

This application claims priority to and is a continuation-in-part of U.S. patent application Ser. No. 15/877,508 entitled "Grease Gun Cartridge Construction" and filed on Jan. 23, 2018, which is a continuation of U.S. patent application Ser. No. 14/997,073 entitled "Grease Gun Cartridge Construction" and filed on Jan. 15, 2016, the contents of which are incorporated herein by reference in their entireties.

FIELD

The present disclosure relates generally to grease guns. More particularly, this disclosure relates to a grease gun cartridge that eliminates the need for a cartridge-housing structure and may replace the commonly-found structure of a grease gun cartridge that is adapted for use with a grease gun having any of a wide variety of grease gun pump configurations.

BACKGROUND

A typical mechanism in a gun head for operating traditional grease gun pumps consists of a grease pressurizing ejection cylinder, with a piston slidably mounted within the cylinder, which reciprocates between a grease loading stroke and a grease pressurizing (ejection) stroke, back and forth across a grease inlet port in the gun head, which port is in communication with the grease pressurizing ejection cylinder in the head. The inlet port is also in communication with a metal barrel grease reservoir, which is removably affixed to the gun head, and may contain a grease cartridge positioned therein. Various typical pump constructions are show, for example, in U.S. Pat. Nos. 3,338,478; 3,344,084; 2,978,151; 1,368,840; 1,349,994; and 4,601,412, the disclosures of which are hereby incorporated herein by reference in their entireties.

In these mechanisms, grease is pressurized by a barrel piston with a compression spring within the barrel, and a barrel piston cocking rod. The compression spring, having one end bearing against the lower inner end of the barrel (not shown) and having its other end bearing against the lower end of the barrel piston within the metal barrel reservoir, urges the grease column within the reservoir, or cartridge within the reservoir, toward and through the inlet port and into the grease pressurizing ejection cylinder. The pump piston, located within the pressurizing ejection cylinder in the gun head, in the gun head closes off the inlet port on its pressurizing (ejection) stroke and forces the grease out of the gun head through a hose to a ZERK or equivalent fitting, and the pump piston opens the inlet port at the end of its suction stroke, loading the pressurizing ejection cylinder with grease urged by means of the compression spring. One-way valving opens the pressurizing ejection cylinder to the hose on the pump piston ejection stroke and closes off the cylinder to the hose on the pump piston suction stroke. Hand operated lever means or dual handle means operates the back and forth reciprocating action of the piston. One-way valving opens the pressurizing ejection cylinder to the hose on the pump piston ejection stroke and closes off the cylinder to the hose on the pump piston suction stroke.

SUMMARY

The present invention eliminates the need for the metal barrel reservoir, barrel piston, compression spring, and a barrel piston cocking rod, commonly found in grease guns on the market today by utilizing a threaded collar, which is adaptable to affix commonly-found grease cartridges and grease guns (pumps) together. This collar may also incorporate the reservoir chamber constructed as a single piece cartridge replacement. The collar and the cartridge replacement are adapted for direct attachment to any of a variety of grease gun head constructions having any of a variety of grease pumping systems, wherein the reservoir chamber wall of the cartridge or cartridge replacement can be of any color or completely clear and see-through. Additionally, a reservoir chamber wiper disk may be used to augment the performance of the invention by providing a more thorough evacuation of the grease within the cartridge or the cartridge replacement. A reservoir chamber end cap with one-way valving structure, which may incorporate an air-pressurizing device, may be used to aid in priming the pump, wherein the grease column within the reservoir chamber is pressured toward and through an inlet port in the gun head, which port opens on the suction stroke of a piston mounted in the pressurizing cylinder of the grease pump, and wherein the grease column pressuring means within the reservoir chamber may comprise ambient air pressure, or air pressure above ambient, impinging on the bottom surface of a grease column.

It is particularly noted that in the above invention structure there is no metal barrel grease reservoir, no spring urged barrel piston, no grease pressurizing compression spring, and no barrel piston cocking rod. This structure reduces the operational effort required for use of the present invention as compared to the heretofore required effort of:

(1) Loosening the barrel from the gun head or opening the air bleed port allowing air to be introduced into the reservoir, allowing the following steps;
(2) retracting a cocking rod against the force of the heavy barrel spring and locking it to the metal barrel end;
(3) unscrewing the barrel from the gun head which is often a slippery and difficult experience;
(4) removing the greasy spent cartridge from the barrel, which is often difficult and messy;
(5) uncapping the bottom end of a filled replacement cartridge;
(6) placing the open bottom end of the replacement cartridge into the barrel;
(7) removing the top cover of the cartridge;
(8) screwing the filled barrel into the gun head;
(9) unlocking the cocking rod and pushing the rod back through the barrel piston and the bottom barrel end; and
(10) After purging commonly trapped air, tighten the barrel to the pump head and close the air bleed port.

It is particularly noted that the above multiplicity of steps is being done with the greasy cocking rod extending about a foot beyond and waving obtrusively about the bottom end of the barrel. The present invention eliminates this onerous procedure and in particular renders the grease gun user-friendly. All that is required when using the cartridge of the present application is to:

(1) remove the filler supplied dust cap from the cartridge;
(2) slide the threaded collar onto the cartridge;
(3) insert wiper disk into the open end of the cartridge;
(4) insert end cap into the open end of the cartridge;
(5) remove the pull tab lid, foil top, or any other cartridge sealing means;

(6) attach the threaded collar into the mounting socket of the grease gun;

When using the single-piece cartridge replacement, steps 1 through 4 above are unnecessary. The following procedure is applicable when using the cartridge replacement:

(1) remove the pull tab lid, foil top, or any other cartridge replacement sealing means;

(2) attach the threaded cartridge replacement into the mounting socket of the grease gun;

To aid in priming the grease gun, an air pump located in the end cap may be used to increase pressure within both the cartridge and the cartridge replacement.

In a first aspect, a viscous fluid reservoir is removably attachable to a pump head and includes: a reservoir body having an open first end and an open second end distal from the open first end; an attachment portion formed adjacent the open first end of the reservoir body, the attachment portion shaped to engage the pump head; a lip adjacent the open second end of the reservoir body, the lip extending at least partially over the open second end of the reservoir body; a wiper disc located within the reservoir body, the wiper disc shaped to slidably engage an inner wall of the reservoir body such that the wiper disc separates a column of viscous fluid within the reservoir body from the open second end of the reservoir body. The wiper disc creates a barrier to substantially separate a column of viscous fluid within the reservoir body from the open second end of the reservoir body. A user may press on the wiper disc to urge a column of viscous fluid within the reservoir body towards the open first end and the pump head when the reservoir is attached to the pump head.

In one embodiment, the wiper disc further includes a resiliently flexible surface located on the wiper disk to aid in containing the viscous fluid within the first closed end of the reservoir. In another embodiment, the attachment means is constructed on the first end of the reservoir.

In yet another embodiment, the wiper disc further includes a wall extending from an edge of the wiper disc, wherein an end portion of the wall contacts the lip at the second end of the viscous fluid reservoir when the wiper disc is adjacent the second end, containing the wiper disk within the reservoir.

In one embodiment, the viscous fluid reservoir further includes a resilient surface formed on a surface of the wiper disc adjacent to an inner wall of the reservoir body for preventing migration of grease through the wiper disc. In another embodiment, the resilient surface is integrally formed on the wiper disc. In yet another embodiment, the resilient surface includes an o-ring located along an edge of the wiper disc.

In a second aspect, a viscous fluid reservoir removably attachable to a pump head includes: a reservoir body having an open first end and an open second end distal from the open first end; an attachment portion formed adjacent the open first end of the reservoir body, the attachment portion shaped to engage the pump head; a lip adjacent the open second end of the reservoir body, the lip extending at least partially over the open second end of the reservoir body; a wiper disc located within the reservoir body, the wiper disc shaped to slidably engage an inner wall of the reservoir body such that the wiper disc separates a column of viscous fluid within the reservoir body from the open second end of the reservoir body; a resiliently flexible surface located on the wiper disk to aid in containing the viscous fluid within the first closed end of the reservoir; a wall extended from an edge of the wiper disc. The wiper disc creates a barrier to substantially separate a column of viscous fluid within the reservoir body from the open second end of the reservoir body. A user may press on the wiper disc to urge a column of viscous fluid within the reservoir body towards the open first end and the pump head when the reservoir is attached to the pump head. An end portion of the wall contacts the lip at the second end of the viscous fluid reservoir when the wiper disc is adjacent the second end, containing the wiper disk within the reservoir.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 1 is a side view of one preferred embodiment of the present non-conventional cartridge wherein the mounting threads are integrally molded with the top of the cartridge wall;

FIG. 2 is a proximal end view of the cartridge of FIG. 1 taken along line 2-2 in FIG. 1;

FIG. 3 is a longitudinal cross-sectional view taken alone line 3-3 in FIG. 1;

FIG. 4 is a side view of a cartridge mounting collar used on conventional grease cartridges;

FIG. 5 is a proximal end view taken along line 5-5 in FIG. 4;

FIG. 6 is a cross-sectional view taken along line 6-6 in FIG. 4;

FIG. 8A is an enlarged view of FIG. 8;

FIG. 12 is a longitudinal cross-section of a variation of the primer structure;

FIG. 13 is an end view taken along line 13-13 in FIG. 12;

FIG. 14 is an end view taken along hug 14-14 in FIG. 12;

FIG. 15 is an alternative primer structure to that shown in FIGS. 1-3 wherein it is particularly useful with cartridges having irregularities such as longitudinal grooves in its inner wall surfaces;

FIG. 16 is an end view taken along line 16-16 in FIG. 15;

FIG. 17 is an enlarged view of dotted area "A" in FIG. 15;

FIG. 18 is a side view of an alternative primer structure;

FIG. 19 is a view taken along line 19-19 in FIG. 18;

FIG. 20 is a cross-sectional view taken along line 20-20 in FIG. 18;

FIG. 21 is a view of the metal grip ring;

FIG. 22 is a side view of the grip ring of FIG. 21;

DETAILED DESCRIPTION

By contrast to prior grease guns, in the present cartridge invention which can be used on any of the gun heads and grease pumping mechanisms presently available and/or as shown in the above noted patents, the present grease cartridge has no metal barrel, no spring urged piston, no piston cocking rod, and no grease pressurizing spring means for forcing the grease toward and through the inlet port and into the loading cylinder. With the present cartridge, the only force which is applied against the bottom end of the grease column within the present cartridge is air pressure provided by ambient air which is in communication with the bottom end of the grease column through one or more air bleed apertures or valving formed through wall portions of the cartridge at locations situated below the bottom end of the grease column and which enters into an ambient air chamber 40. Where the pumping mechanism of the grease gun does not provide adequate suction (not typical) in the loading cylinder to become self-priming when using the present cartridge, a priming device such as the priming bulb shown, for example, in accompanying FIGS. 8-13 may be used to temporarily provide a small additional air pressure to the bottom of the grease column. It is noted that in the conventional off-the-shelf grease cartridges on the market, the bottom of the grease column does not extend to the bottom end of the cartridge such as to provide a lead-in portion of the cartridge wall for entry of the grease pressurizing piston which is mounted on the cocking rod. This lead-in portion provides space for the introduction of the present wiper disc and auxiliary primer and one-way valving structures.

Figure 3A:
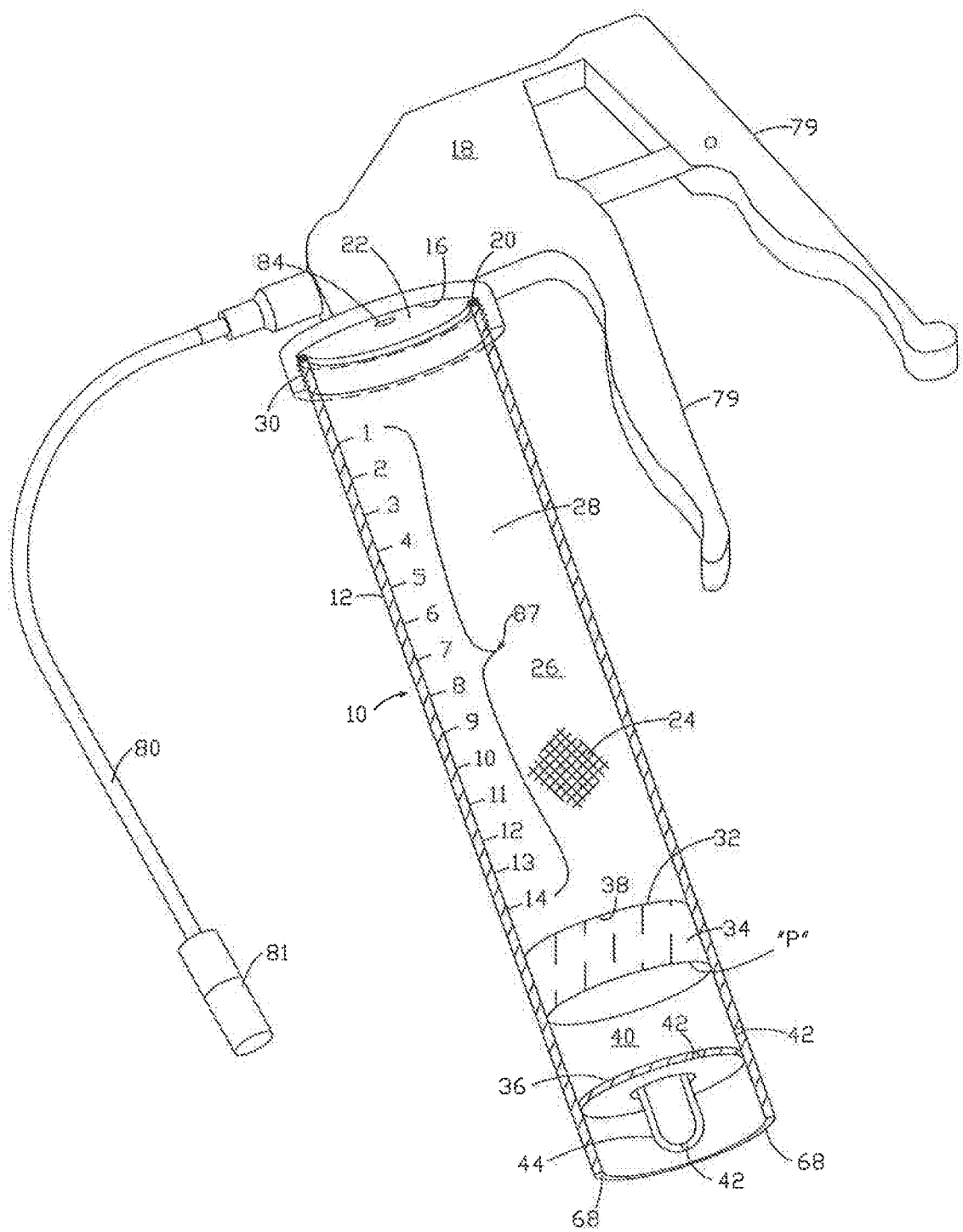
FIG. 3A is a perspective, partially cross-sectioned view of an assembly of the present non-collar cartridge of FIGS. 1-3 (having integrally molded mounting threads), and a conventional grease gun head.
Figure 6A:
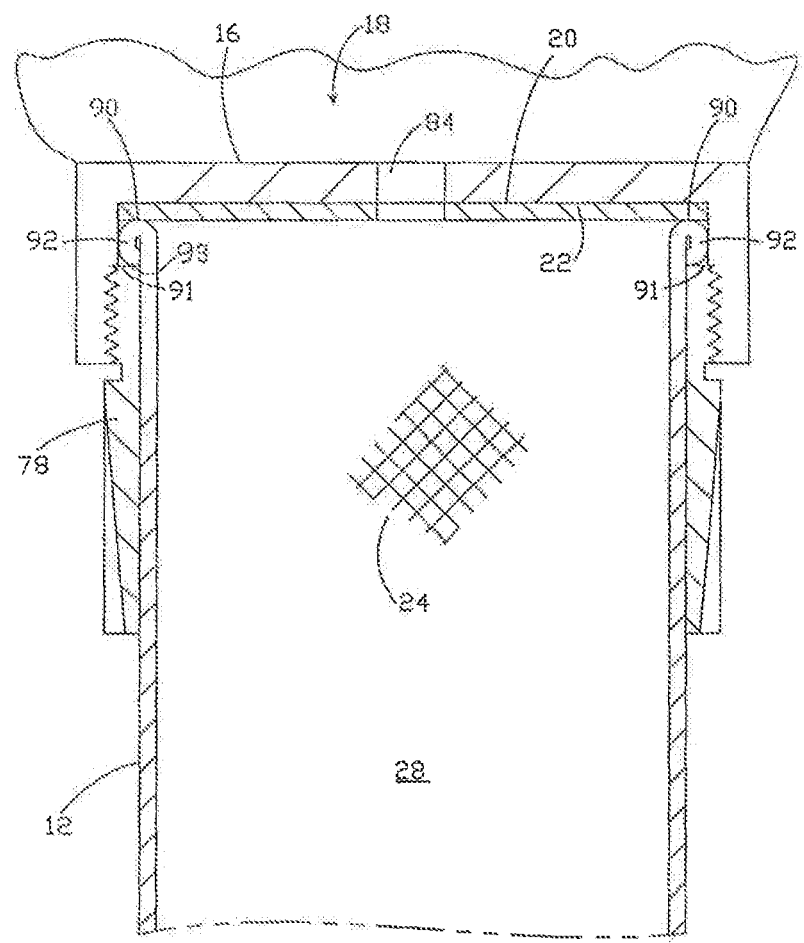
FIG. 6A is an enlarged cross-section of a collar type of cartridge-to-gun head mounting structure.
Figure 6B:
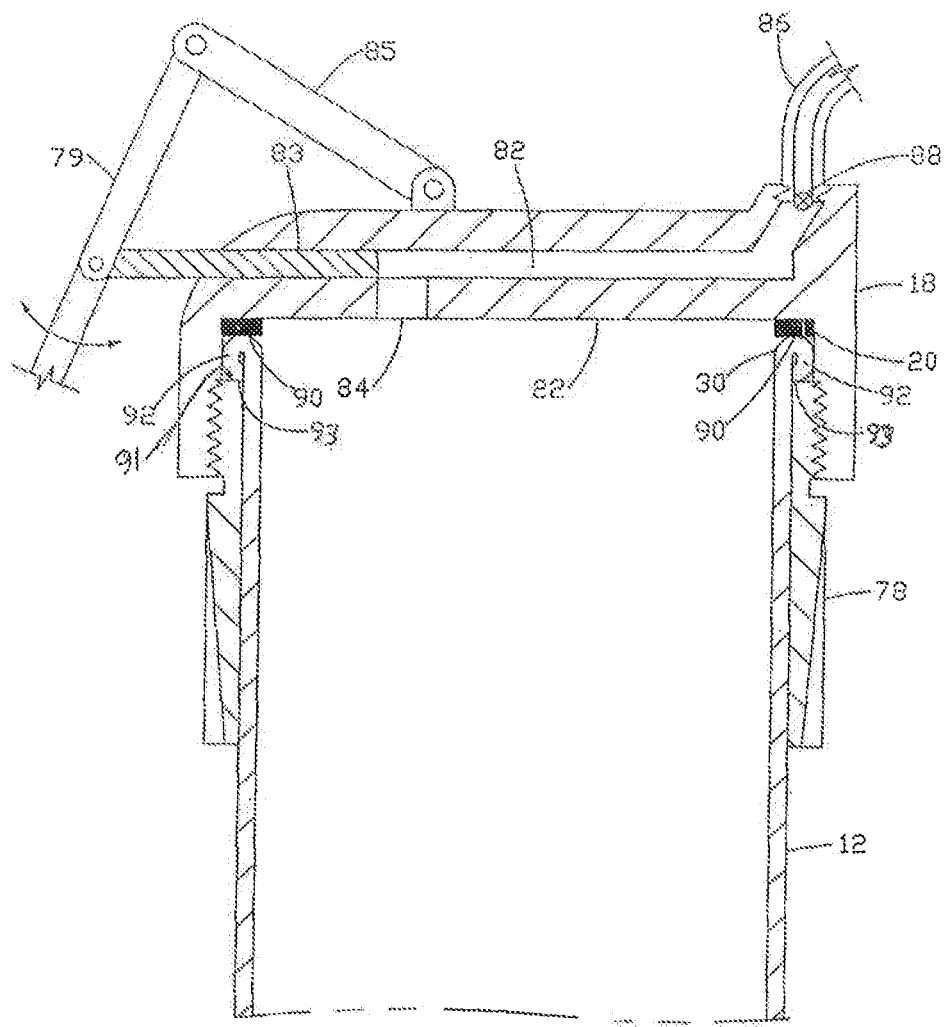
FIG. 6B is a view as in FIG. 6A and additionally showing a typical grease gun head and grease pumping system.
Figure 10:
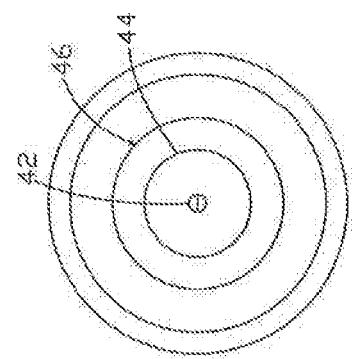
FIG. 10 is an end view taken along line 10-10 in FIG. 9.
Figure 7:
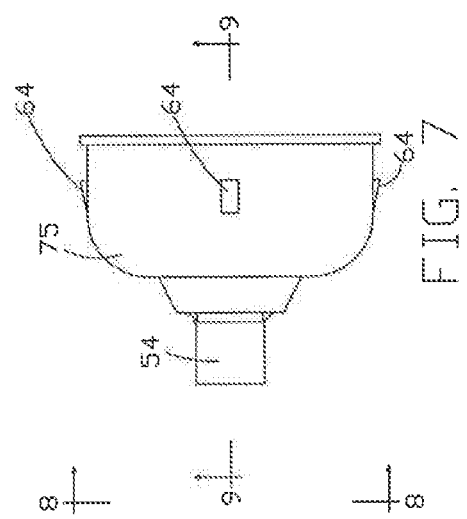
FIG. 7 is a side view of the primer bulb housing.
Figure 9:
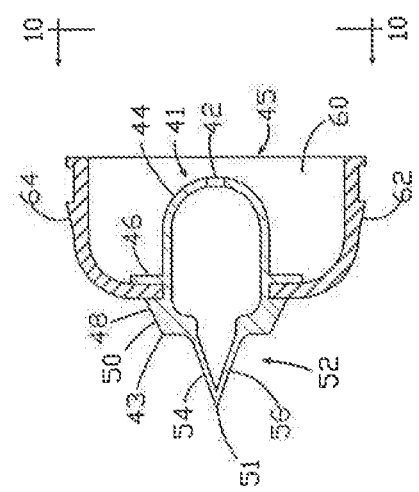
FIG. 9 is a cross-sectional view taken along line 9-9 in FIG. 7.
Figure 8:
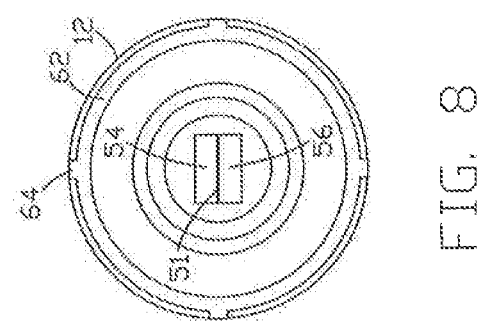
FIG. 8 is a distal end view taken along line 8-8 in FIG. 7.
Figure 11:
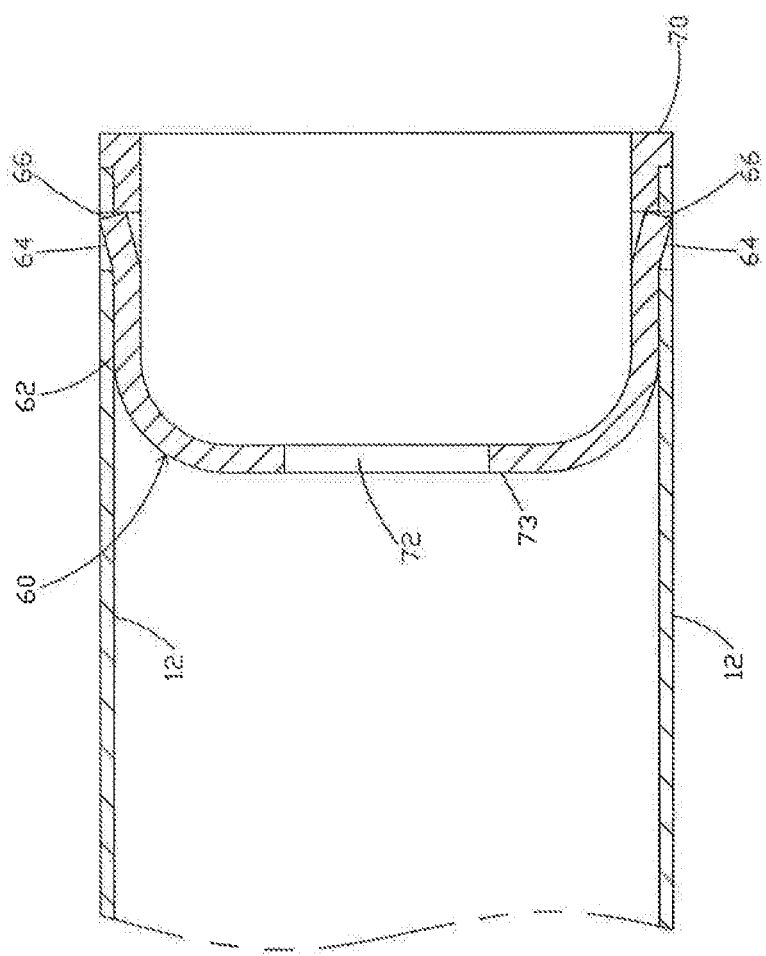
FIG. 11 is an enlarged cross-sectional view of the dotted (in FIG. 3) snap-in region of the primer structure into the cartridge bottom ends.

As shown in FIGS. 3A and 6B, the typical grease gun head 18 is provided with an annular mounting socket 16 the side wall of which is internally threaded for receiving the externally threaded end of a metal grease cartridge containing barrel (not shown). The present cartridge 10, preferably of molded plastic, is threaded at its distal upper end 30 for threading into the conventional mounting socket 16 and sealing against a sealing surface of the socket, which sealing surface, preferably, comprises an annular elastomeric gasket 20. Alternatively, the seal can be the elastomeric deformable distal (upper) distal end 30 of the cartridge wall itself sealing against the roof 22 of socket 16

The grease guns having utility with the present invention include those as shown in FIGS. 6B and 3A, having the conventional structures of gun head 18, pump handles or lever 79, grease hose 80, ZERK fitting 81 and the like, and the grease pumping system having piston (loading) cylinder 82, piston 83, grease inlet port 84 to 82, handle or lever actuating linage 85, and grease outlet port 86 with one-way valving 88.

In the embodiment shown in FIGS. 4-6B, an annular collar 78 is dimensioned for a close sliding fit on the cylindrical cartridge wall 12 and is formed with an annular upper surface 91 for sealingly engaging the undersides 93 of the annular lip 92, formed, e.g., during molding or curling the distal (upper) end 30 of a fabricated or molded plastic cartridge and, by threading said end into the mounting socket and forcing the upper surface 90 of cartridge lip 92 into sealing engagement with the roof 22 or seal 20 of the mounting socket 16.

Referring to FIGS. 1-3 of the drawings the present cartridge 10 in a non-collar embodiment, is preferably, of molded industrial plastic material such as, polyolefins, polyurethane, polyester, polyimide, polycarbonate or various copolymers, comprises a cylindrical wall 12 having a threaded top end 14 adapted to be screwed into a mounting socket 16 of a grease gun head 18 and preferably sealed against an annular elastomeric seal 20 fitted against the roof 22 of socket 16. Grease 24 initially fills cartridge chamber 26 to a desired level and forms a grease column 28 extending between the upper end 30 of the cartridge and the top 32 of a wiper disc 34 of slippery plastic material should such a disc be used. The wiper disc is not critical to the operation of the present cartridge but can assist in distributing the ambient air pressure "P" evenly against the bottom end surface 38 of the grease column. Also, the disc eliminates or at least minimizes any rogue grease migration which might occur down along the lower inner side portions of wall 12 and into the ambient air chamber 40. The air pressure in chamber 40 is maintained substantially constant by one or more air bleed ports 42 which can be provided in any portion of wall 12 which wall includes end cap portion 36, which portions below the bottom end surface 38 of the grease column 28. As shown in FIG. 1, a removable cap 76 is pushed or screwed down over the threaded end of the cartridge to contain the grease and to protect the threads at end 14 prior to use of the cartridge.

In a preferred embodiment of the use of a primer device, the air bleed port 42 is provided by way of a primer structure 45 having a primer housing 47 as shown in detail in FIGS. 9-11 15, 16 and 17 wherein a primer bulb section 41 comprises a body portion 43 having a resilient elastomeric squeeze bulb 44, a first annular stop shoulder 46 and a second annular stop shoulder 48 having an annular beveled lead-in surface 50. Said body portion 43 being formed with a one-way valve section 52 comprising lips or flaps 54 and 56 which form slit 51 which is normally tightly, sealingly closed as shown e.g., in FIGS. 8 and 9, but which opens as shown by dotted line 58 in FIG. 8A upon squeezing bulb 44 to force air through slit 51. Primer structure 45 in FIGS. 8-11 further comprises a. mounting cap or body 60 having an annular snap on flange 62 having, e.g., 3-8 spurs 64 raised outwardly on its outer surface, wherein both the flange and the spurs will spring outwardly to nest the spurs into slots 66 in cartridge wall 12 upon flange 62 being forcibly pushed and flexed radially inwardly into the bottom end 68 of the cartridge wall wherein annular rim 70 on flange 62 will engage the bottom end 68 of cartridge wall 12 to properly position structure 45 within the cartridge.

Cap 60 (FIG. 11) is formed with a primer bulb mounting aperture 72 formed in wall 73 of the cap 60 and through which aperture the bulb section 41 is pushed (FIG. 9) to engage beveled leading edge surface 50 with aperture 72 edges to cam body portion 43 radially inward to snap and lock bulb section 41 into wall 73 between shoulders 46 and 48 of section 41.

It is noted that grease cartridge tubes presently on the market have on one end a removable, tear away metal top closure member which is provided with a finger pull tab for easy tear removal of the closure member. A removable cap is positioned over the bottom end of the cartridge. In using such off-the-shelf cartridges in accordance with the present invention, the bottom cap is removed and the alternative to FIGS. 1-3 if a primer is to be used, a primer housing 47 (FIGS. 15-17), is pushed up into the bottom end 68 of the cartridge against elastomeric seal 69 and then rotated slightly by finger grips 71, e.g., ⅟₃₂ to ⅛ of an inch to score wall 12 and lock the metal points 77 which are molded into the primer housing wall 75, into the cartridge wall 12. Where a primer is not used, the primer housing 47, without the primer bulb section 41 and one way valving section 52 is replaced with an ambient air bleed port 42. The cartridge wall 12 may be provided with any indicia such as grease level markings 87, manufactures notations, or grease type or the like.

Referring to FIGS. 19-22, a highly preferred embodiment of the primer/one way air valve 95 is shown wherein housing or end cap 96 is provided with an O-ring type seal 100 or an equivalent seal or a sealing compound which will prevent leakages of grease from the bottom end of the cartridge even though there might be irregularities in the inner surface of the cartridge wall which otherwise could form grease leakage channels. The mechanical properties of the seal should provide for conformation of the seal to the configuration of substantial irregularities.

Further, housing 96 is provided with an annular grip ring which is formed with sharp edged gripping teeth 99 which will flex inwardly against the housing wall as the housing is being forced into the bottom end of the cylinder until it is stopped by engagement of annular rim 98 with the cartridge bottom end. At this point, the teeth ends will be in engagement with and will bite into the inner wall of the cartridge and prevent extraction of the housing from the cartridge. In assembling the ring onto the housing, the ring is forced over the air outlet end of the housing whereby the housing wall will resiliently flex radially inwardly sufficiently to allow the ring to slide into the annular groove as shown in FIG. 20.

Figure 23:
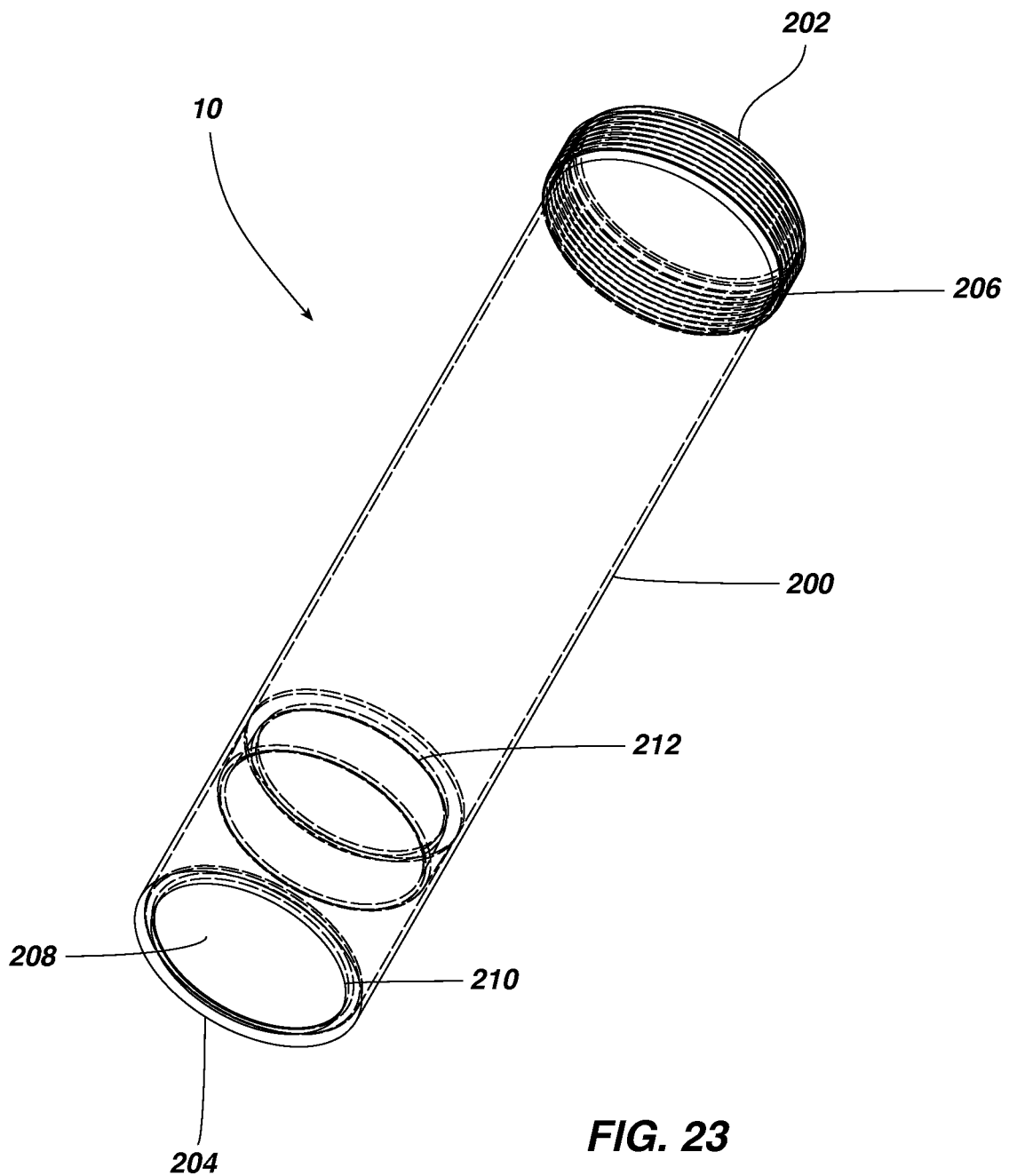
FIG. 23 is a perspective cross-sectional view of a cartridge according to one embodiment of the present disclosure.

Referring to FIG. 23, in one embodiment the cartridge 10 is adapted to be directly attached to the grease gun head 18 of FIGS. 3A and 6B and may be constructed such that a user manually urges grease within the cartridge 10 towards the grease gun head 18. The cartridge 10 includes a reservoir 200 that is preferably formed into an elongate cylinder and is shaped to contain a viscous fluid such as grease. The reservoir 200 includes a first end 202 and a second end 204 that is distal from the first end 202.

Figure 24A:
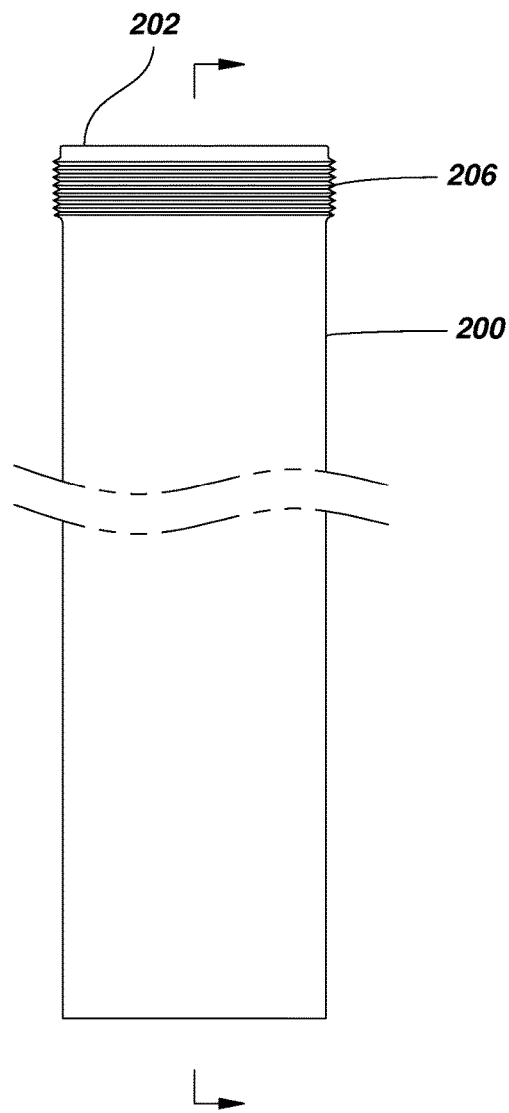
FIG. 24A is a side view of a cartridge according to one embodiment of the present disclosure.

Any variety of attachment portion 206 is preferably formed on the first end 202 of the reservoir 200 and is adapted to fit the grease gun head 18. FIG. 24A depicts the attachment portion as being threaded.

Figure 24B:
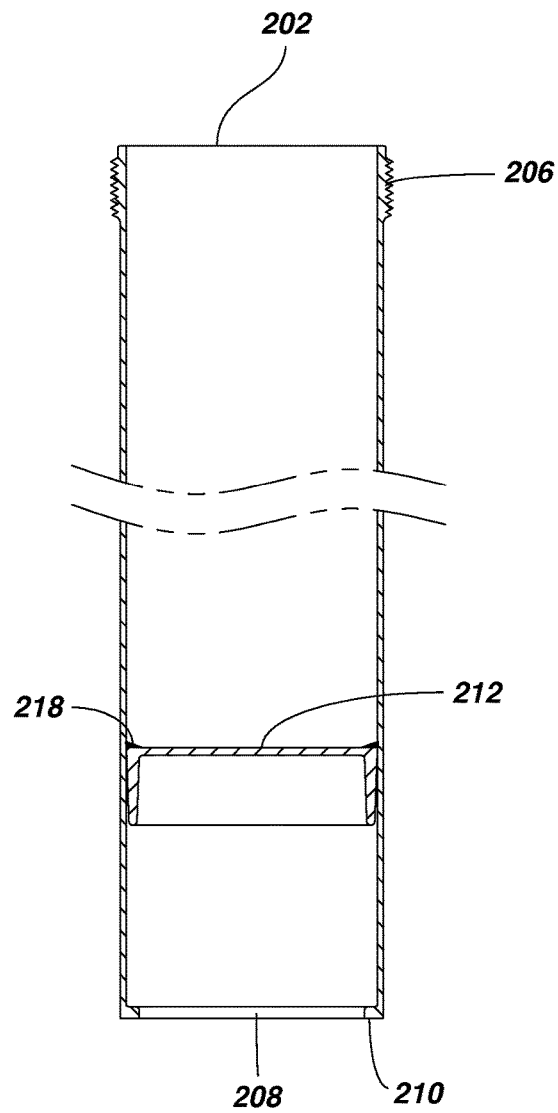
FIG. 24B is a cross-sectional side view of a cartridge and wiper disc according to one embodiment of the present disclosure.

Referring to FIGS. 24A and 24B, the attachment portion 206 is preferably formed on the first end 202 of the reservoir 200. In one preferable embodiment, the reservoir 200 depicted in FIG. 24A, is constructed of a polymer and a threaded attachment portion 206 is formed as part of reservoir 200.

The second end 204 of the reservoir 200 includes an open portion 208 formed through the second end 204 of the reservoir 200. The second end 204 of the reservoir also includes a lip 210 formed around the second end 204 of the reservoir 200 and surrounding the open portion 208 as discussed in greater detail below. The lip 210 may be formed as part of the reservoir 200 during its construction.

Figure 26:
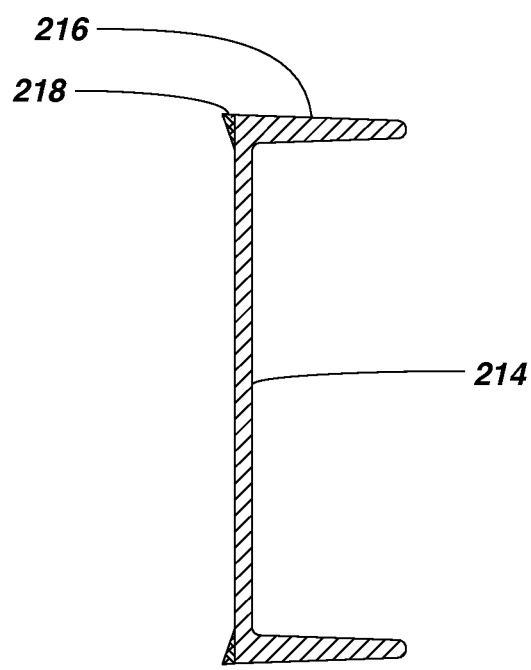
FIG. 26 is a cross-sectional side view of a wiper disc according to one embodiment of the present disclosure.

Referring again to FIG. 23, the reservoir 200 may contain a wiper disc 212 disposed within the reservoir 200 and slidable along a length of an interior of the reservoir 200. The wiper disc 212 is shaped to conform to an inner surface of the reservoir 200. The wiper disk 212 provides separation of viscous fluid in chamber 26 from air chamber 40. The wiper disk 212 also minimizes rogue grease migration which may occur along the inner side portions of wall 12 and into air chamber 40. The wiper disk 212 may incorporate or contain a resilient surface 218 and may have multiple configurations, such as o-ring(s) or other resiliently flexible material(s), and/or other elastomers and the like, which may incorporate various attachment means. As shown in FIG. 26, the resilient surface 218 is constructed as an integral part of wiper disk 212. Resilient surface 218 is designed to more readily conform to irregularities, which may occur along the interior surface of the reservoir 200, thereby substantially aiding in the minimization of rogue grease migration.

Figure 25:
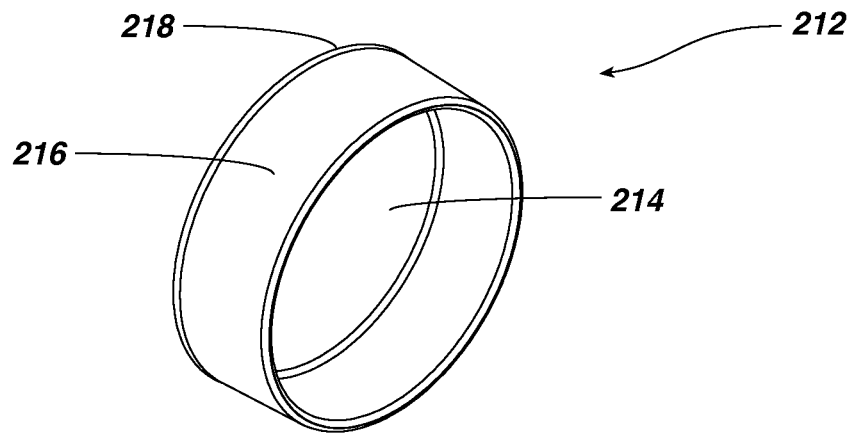
FIG. 25 is a perspective view of a wiper disc according to one embodiment of the present disclosure.

The wiper disc 212 preferably includes a solid end portion 214 with an opposite open end portion and a wall 216 extending from the solid end portion 214, as shown in FIG. 25. Resilient surface 218 may be positioned on solid end portion 214 as shown in FIG. 26 and/or at any location along wall 216. As shown in FIG. 23, wall 216 of wiper disc 212 is shaped such that when wiper disc 212 is adjacent second end 204 of the reservoir 200, open end portion of wiper disk 212 (end of wall 216) contacts the lip 210 at second end 204 of the reservoir 200, containing wiper disc 212 within the reservoir 200.

During assembly of reservoir 200, wiper disc 212 is inserted into the reservoir 200 through open first end 202 of the reservoir 200. After inserting wiper disc 212, a column of grease or other viscous fluid may be placed in the reservoir 200. Grease may be placed within the reservoir 200 until the wiper disc 212 is urged against the lip 210 on the second end 204 of the reservoir 200. The cartridge 10 may be subsequently sealed, such as by placing a removable seal over the open first end 202 and the second end 204 of the reservoir 200.

In use, a user may remove any removable seals placed on the cartridge 10. The cartridge 10 may be directly attached to the grease gun head 18, such as by engaging the threaded portion 206 with threads of the grease gun head 18. The user may subsequently press on the wiper disc 212 through the second end 204 of the cartridge 10 to urge grease within the cartridge 10 towards the grease gun head 18. As grease is drawn out of the cartridge and into the grease gun head 18 during use, the wiper disc 212 may follow the column of grease and slide along an interior wall of the reservoir 200. The wiper disc 212 substantially seals grease within the cartridge 10 such that grease does not escape from the second end of the elongate cartridge body 204.

Embodiments of the invention described herein advantageously allow a user to operate a grease gun without requiring the user to attempt to insert a cartridge into an existing cartridge housing or other similar structure, thereby greatly reducing any mess created by grease coming into contact with additional components of the grease gun or any housing structure. The reservoir 200 is easily replaceable and substantially reduces the potential of grease coming in contact with the user.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A viscous fluid reservoir removably attachable to a pump head, the reservoir comprising:
    a reservoir body having an open first end and an open second end distal from the open first end;
    an attachment portion formed adjacent the open first end of the reservoir body, the attachment portion shaped to engage the pump head;
    a lip adjacent the open second end of the reservoir body, the lip extending at least partially over the open second end of the reservoir body;
    a wiper disc located within the reservoir body, the wiper disc shaped to slidably engage an inner wall of the reservoir body such that the wiper disc separates a column of viscous fluid within the reservoir body from the open second end of the reservoir body, the wiper disc including a first face oriented towards the open second end of the reservoir body and a second face located on an opposite side thereof;
    a wall extending from an edge of the wiper disc, wherein an end portion of the wall contacts the lip at the second end of the viscous fluid reservoir when the wiper disc is adjacent the second end, containing the wiper disk within the reservoir;
    a resilient seal formed on the wiper disc adjacent to an inner wall of the reservoir body for preventing migration of grease through the wiper disc, the resilient seal protruding from the second face and into the reservoir body;
    wherein the wiper disc creates a barrier to substantially separate a column of viscous fluid within the reservoir body from the open second end of the reservoir body; and
    wherein a user may press on the wiper disc to urge a column of viscous fluid within the reservoir body towards the open first end and the pump head when the reservoir is attached to the pump head.

2. The viscous fluid reservoir of claim 1, wherein the attachment means is constructed on the first end of the reservoir.

3. The viscous fluid reservoir of claim 1, wherein the resilient seal is integrally formed on the wiper disc.

4. The viscous fluid reservoir of claim 3, wherein the resilient surface comprises an o-ring located along an edge of the wiper disc.

5. A viscous fluid reservoir removably attachable to a pump head, the reservoir comprising:
    a reservoir body having an open first end and an open second end distal from the open first end;
    an attachment portion formed adjacent the open first end of the reservoir body, the attachment portion shaped to engage the pump head;
    a lip adjacent the open second end of the reservoir body, the lip extending at least partially over the open second end of the reservoir body;
    a wiper disc located within the reservoir body, the wiper disc shaped to slidably engage an inner wall of the reservoir body such that the wiper disc separates a column of viscous fluid within the reservoir body from the open second end of the reservoir body;
    a wall extending from an edge of the wiper disc;
    a resilient seal formed on the surface of the wiper disc adjacent to an inner wall of the reservoir body for preventing migration of grease through the wiper disc, the resilient seal protruding from the second face and into the reservoir body;
    wherein the wiper disc creates a barrier to substantially separate a column of viscous fluid within the reservoir body from the open second end of the reservoir body;
    wherein the wall extending from the edge of the wiper disc tapers inwardly from the inner wall of the reservoir body;
    wherein a user may press on the wiper disc to urge a column of viscous fluid within the reservoir body towards the open first end and the pump head when the reservoir is attached to the pump head; and
    wherein an end portion of the wall contacts the lip at the second end of the viscous fluid reservoir when the wiper disc is adjacent the second end, containing the wiper disk within the reservoir.

6. The viscous fluid reservoir of claim 1, wherein the wall extending from the edge of the wiper disc tapers inwardly from the inner wall of the reservoir body.

* * * * *